US012782758B2

(12) United States Patent
Xiao et al.

(10) Patent No.: US 12,782,758 B2
(45) Date of Patent: Nov. 3, 2026

(54) SPLIT-TYPE SMART GLASSES

(71) Applicant: Ling Xiao, Fuzhou (CN)

(72) Inventors: Xiaosong Xiao, Fuzhou (CN); Youyang Peng, Fuzhou (CN); Ling Xiao, Fuzhou (CN); Kaili He, Fuzhou (CN)

(*) Notice: Subject to any disclaimer, the term of this patent is extended or adjusted under 35 U.S.C. 154(b) by 255 days.

(21) Appl. No.: 18/434,810

(22) Filed: Feb. 7, 2024

(65) Prior Publication Data

US 2025/0180930 A1 Jun. 5, 2025

(30) Foreign Application Priority Data

Dec. 1, 2023 (CN) ........................ 202311635137.X

(51) Int. Cl.

| | |
|---|---|
| ***G02C 11/00*** | (2006.01) |
| ***G02B 27/01*** | (2006.01) |
| ***G06F 1/16*** | (2006.01) |
| ***H02J 50/00*** | (2016.01) |

(52) U.S. Cl.

CPC .......... *G02C 11/10* (2013.01); *G02B 27/0176* (2013.01); *G06F 1/163* (2013.01); *H02J 50/005* (2020.01); *G02B 2027/0152* (2013.01); *G02B 2027/0178* (2013.01); *G02C 2200/02* (2013.01)

(58) Field of Classification Search

None

See application file for complete search history.

(56) References Cited

U.S. PATENT DOCUMENTS

| | | | | | |
|---|---|---|---|---|---|
| 7,023,594 | B2 * | 4/2006 | Blum | G02F 1/134309 | 351/159.03 |
| 7,438,410 | B1 * | 10/2008 | Howell | G02C 11/00 | 351/158 |
| 7,566,244 | B1 * | 7/2009 | Nguyen | G02B 6/4284 | 439/352 |
| 10,061,352 | B1 * | 8/2018 | Trail | G02B 27/0172 | |
| 12,418,141 | B1 * | 9/2025 | Yue | H01R 31/06 | |
| 2006/0177086 | A1 * | 8/2006 | Rye | H04R 5/0335 | 351/123 |
| 2012/0021618 | A1 * | 1/2012 | Schultz | H01F 7/02 | 439/38 |
| 2012/0252231 | A1 * | 10/2012 | Kall | H01R 13/6205 | 439/39 |
| 2017/0093104 | A1 * | 3/2017 | Powers | H01R 31/065 | |

* cited by examiner

*Primary Examiner* — Robert E. Tallman

(57) ABSTRACT

The invention discloses a split-type smart glasses comprising smart glasses body, wearable division containing battery, and automatic magnetic connection device for automatically attracting and connecting power supply of smart glasses body and wearable division and/or data transmission lines; eyeglass strap for connecting two glasses legs are provided therebetween of glasses body; upper transmission line is hidden inside eyeglass strap and leads out of middle section of eyeglass strap to connect to automatic magnetic connection device; wearable division is connected to automatic magnetic connection device via lower transmission line. Power data transmission line of wearable division extends to shoulder and neck behind head concealedly from wearing position, fixed on clothing to remove weight of transmission line; meanwhile, it undertakes most of transmission line weight of main body; user's activities of head up and down, left and right are not subject to interference of transmission line's dragging, without affecting user's image.

8 Claims, 3 Drawing Sheets

SPLIT-TYPE SMART GLASSES

1. TECHNICAL FIELD

The invention relates to the technical field of smart glasses, and specifically relates to a split-type smart glasses.

2. BACKGROUND ART

As we all know, the two major computing platforms of PC computers and smartphones have already reached the ceiling of innovation, and the next-generation mobile wearable computing platforms which are stronger than both of them are on the verge of emergence. Similar to the keyboard and mouse windows of PC computers and the human-computer interaction of smartphone touchscreens, which are the key short-board technologies that enable the two computing platforms to innovate for new generations, smart glasses are also the key short-board technologies that enable the human-computer interaction output display of the next-generation mobile wearable computing platforms.

Since the invention of smart glasses by Google in 2012, the problem that battery and computing unit weight of smart glasses set on the ear and nose bridge seriously affects the battery life persists to this day, the market has been divided into two major categories of smart glasses, namely all-in-one glasses and split-type glasses, the biggest problem for all-in-one glasses containing battery and computing unit is that the weight of the whole glasses is still too heavy, and the battery life is too short; split-type glasses set up the battery and the glasses main body with the main body division separately to reduce the weight of the glasses and increase the battery life, but the weight of its about 5 mm thick power cable makes the ear difficult to bear its long time hanging, and the longer transmission line make it inconvenient for the user to take off each time as the user's activities of head up and down, left and right are subject to the interference of the transmission line's dragging and pulling restraints, the long and thick transmission line hanging around the ear also affects the user's image, so the public is reluctant to use it. People are looking forward to the emergence of smart glasses that have the advantages of no trailing wires and easy to put on and use, as well as meeting the demand for long-lasting output displays, as in the case of split smart glasses. However, the technical problems that have plagued the industry for many years are basically unresolved before the introduction of new wearable batteries with high specific energy.

For example, in Chinese patent CN216119548U, the way of connecting smart glasses with the thicker data line of smart phones to transmit audio/video data and for continuous power supply is troublesome to connect, and the use of the data cable is subject to interference.

Another example: in Chinese patent CN209311821U, the battery is arranged in the glass legs of the smart glasses, and in order to reduce weight added to the ear and nose bridge, the battery capacity is limited, and there is a drawback in battery life.

Another example: China's patent CN216285995U discloses a binocular AR wireless glasses, the battery and the glasses body are arranged separately, but actually it is an integral smart glasses by fixing each other through soft connection of charging cables, although the battery weight is offloaded to the shoulder around the neck, it also has disadvantages of heavy to wear and take off; in order to charge, the whole must be taken off and wear, if you want the battery life can last a whole day, you need to be equipped with a thick battery around the neck, and the design is not in line with the principle of man-machine aesthetics, and people will give up using it for the sake of beauty.

Therefore, a kind of split-type smart glasses has become an urgent problem for people to solve.

3. SUMMARY OF THE INVENTION

The technical problem to be solved by the invention is a split-type smart glasses powered by automatically connecting battery and data line in the air.

In order to solve said technical problem, the technical scheme provided by the invention is as follows: a split-type smart glasses, comprising a smart glasses body for human-computer interaction output display, a wearable division containing battery, and an automatic magnetic connection device for automatically attracting and connecting the power supply of smart glasses body and wearable division and/or data transmission lines;

Said smart glasses body exists in prior art, and the smart glasses is capable of superimposing video image for a walking user in the reality view of the glasses, an eyeglass strap for connecting the two glasses legs are provided between two glasses legs of the smart glasses body; an upper transmission line is hidden inside the eyeglass strap, and the upper transmission line leads out of the middle section of the eyeglass strap to connect to the automatic magnetic connection device; the wearable division is connected to the automatic magnetic connection device via lower transmission line.

Further, said automatic magnetic connection device comprises an upper magnetic connector and a lower magnetic connector, said upper magnetic connector being connected to the glasses strap via the upper transmission line, said lower transmission line extending to the scruff of user's neck to connect to the lower magnetic connector.

Further, said lower magnetic connector is provided with a guiding block, which enables the lower magnetic connector to always face upwards, and at the same time enables the upper magnetic connector to be automatically attracted and guided by the lower magnetic connector until they are correctly aligned and attracted to each other.

Further, said lower magnetic connector is provided with a fixing member, which fixes the lower magnetic connector to the collar or wearing apparel in a position at the scruff of user's neck.

Further, said wearable division is a wearable computer mainframe division containing battery or an external battery division after the wearable computer mainframe has been separated.

When said wearable division is a wearable computer mainframe division containing battery, said mainframe casts a screen display for the smart glasses through the transmission line being automatically connected; when the wearable computer mainframe is detached, the external battery division left behind can use a thinner transmission line that is automatically connected only for powering the smart glasses to give the user a more comfortable wearing experience.

Further, the outer surface of said wearable division is provided with magnetic charging transmitting coil for wireless charging for the wearable computer mainframe or other devices and socket for charging or powering itself or/and other devices.

Compared with the prior art, the invention has following advantages: the thick and heavy power data transmission line of the wearable division of the invention extends to the shoulder and neck position behind the head in a hidden manner from its wearing position, avoid dragging the transmission line of the main body connected therewith and is fixed on the clothing to remove the weight of the transmission line, and at the same time, it also undertakes most of weight of the transmission line of the main body; the glasses main body and its short extending transmission line form a simple glasses with strap; the transmission line of the main body is automatically connected to the transmission line of the division part, and the finally achieving simple glasses appearance without long trailing lines, and the electrical connection with the division is completed automatically, so that putting on and taking off the glasses is simpler than the existing all-in-one and split-type glasses. the user's activities of head up and down, left and right are not subject to the interference of the transmission line's dragging and pulling restraints, without affecting the user's image, and it can satisfy the purpose of the whole day's long-lasting work.

4. BRIEF DESCRIPTION OF ACCOMPANY DRAWINGS

Figure 1:
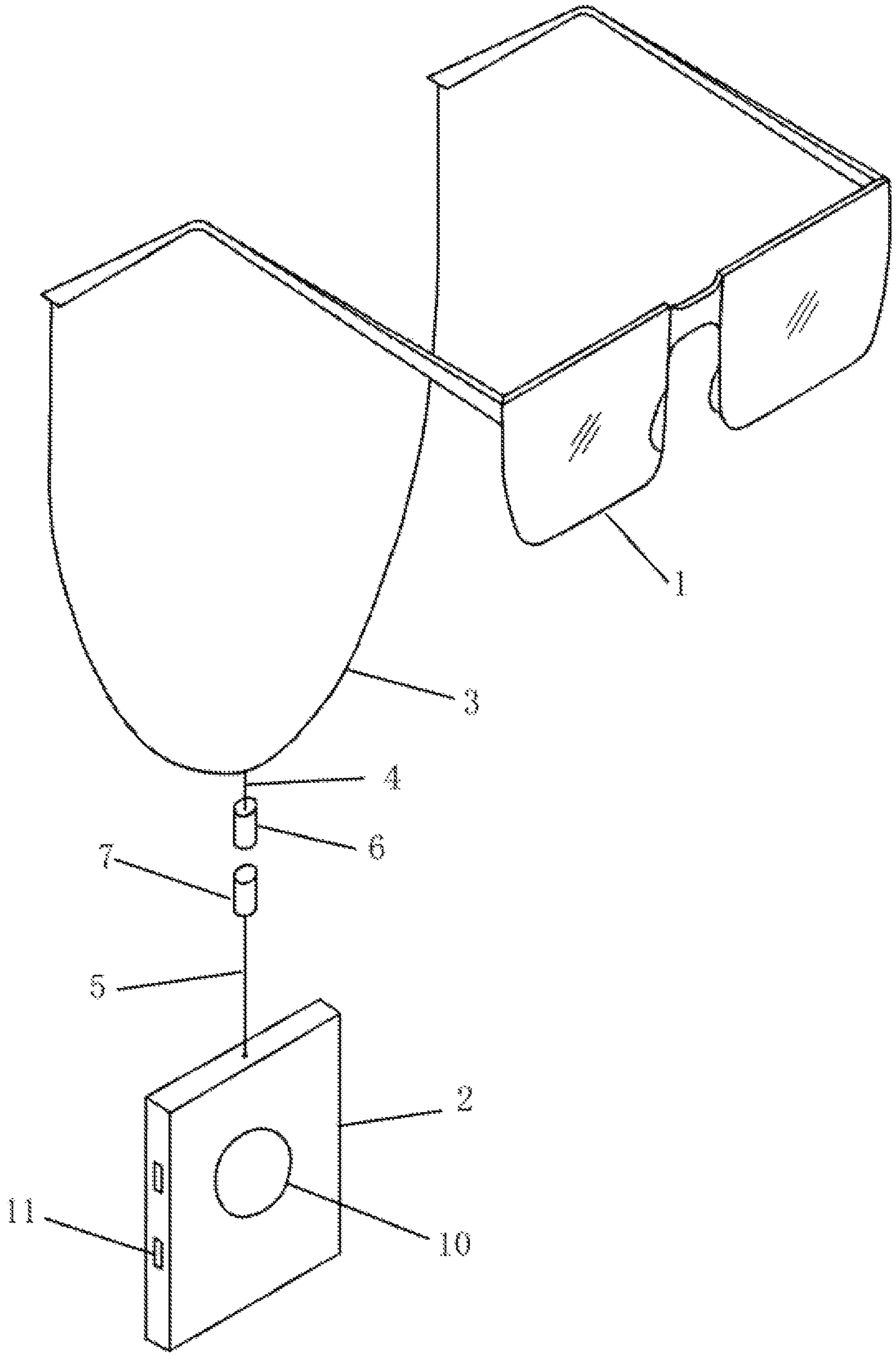
FIG. 1 is the structural diagram of the split-type smart glasses provided by the invention.

In the drawings: 1 smart glasses body, 2 wearable division, 3 eyeglass strap, 4 upper transmission line, 5 lower transmission line, 6 upper magnetic connector, 7 lower magnetic connector, 8 guiding block, 9 fixing member, 10 magnetic charging transmitting coil, 11 socket.

5. SPECIFIC EMBODIMENT OF THE INVENTION

The invention is further described in detail hereinafter with reference to the drawings.

Figure 2:
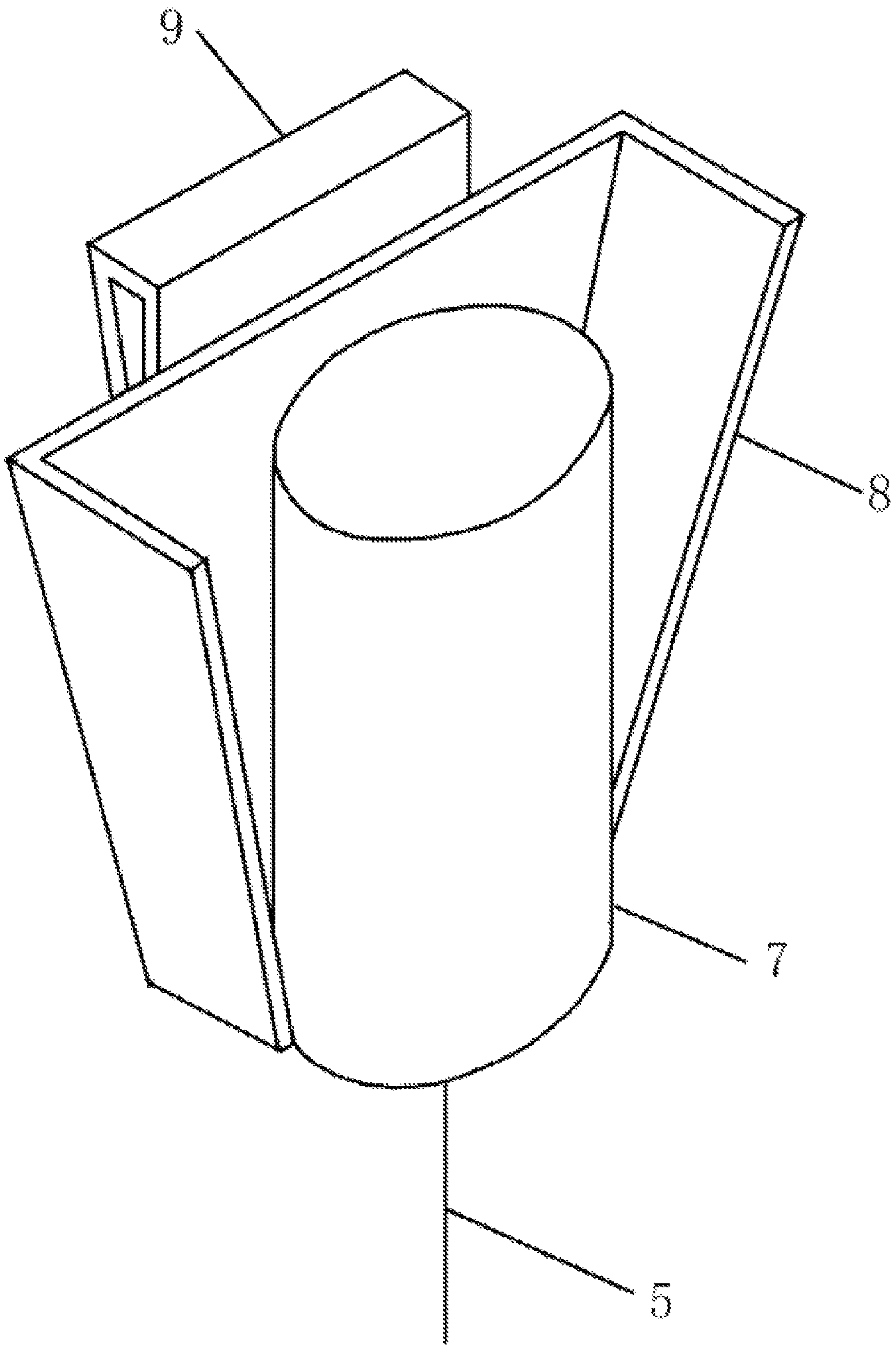
FIG. 2 is the structural diagram illustrating the lower magnetic connector, guiding block and fixing member.
Figure 3:
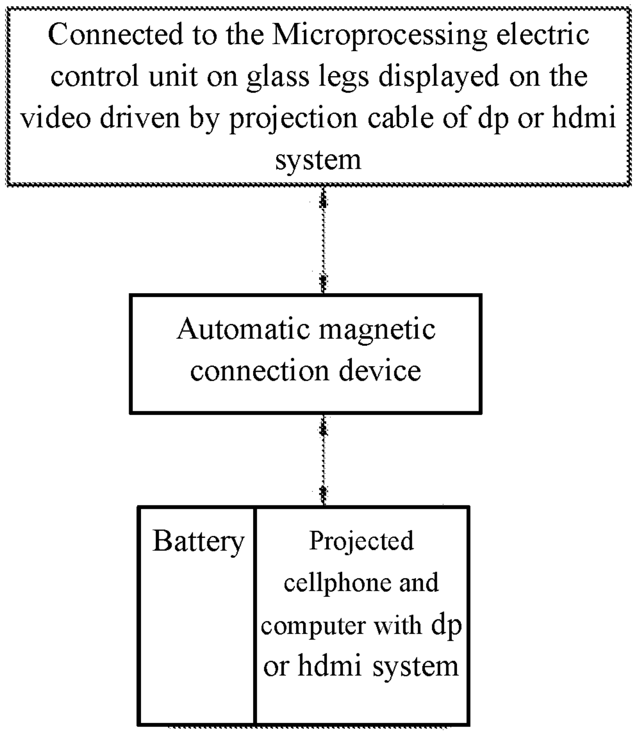
FIG. 3 is the electric control block diagram of the embodiment provided by the invention.

With reference to FIGS. 1 to 3, the specific implementing process for the invention—a split-type smart glasses—is as follows:

a split-type smart glasses comprises a smart glasses body 1 for providing mobile human-computer interaction output display, a wearable division 2 containing battery (said wearable division 2 is a wearable computer division containing battery or an external battery division of the wearable computer), and an automatic magnetic connection device for automatically attracting and connecting the power supply of smart glasses body 1 and wearable division 2 and/or data transmission lines;

Said automatic magnetic connection device comprises an upper magnetic connector 6 and a lower magnetic connector 7, eyeglass strap 3 for connecting the two glasses legs are provided between two glasses legs of the smart glasses body 1; an upper transmission line 4 with power supply and/or data transmission function is hidden inside the eyeglass strap 3 to be connected to the smart glasses body 1; the upper transmission line 4 can be introduced into the eyeglass strap 3 from one side of the glasses leg in a single bundle or in two bundles from both glasses legs, and leads out of the middle section of the eyeglass strap to connect to the upper magnetic connector 6 (with reference to FIG. 1, in the embodiment, transmission line is introduced into the eyeglass strap in two bundles from both glasses legs to make the single eyeglass strap finer and softer); the wearable division 2 is connected to the lower magnetic connector 7 at the scruff of user's neck via the lower transmission line 5 with power supply and/or data transmission function.

When the user (from the head down) hangs the smart glasses body 1 connected with the eyeglass strap 3 on both ears and the nose bridge, the upper magnetic connector 6 and the lower magnetic connector 7 on the wearable division 2 are automatically attracted and connected together, and at the same time, the upper transmission line 4 and lower transmission line 5 of the two are automatically connected and conducted, forming an automatic magnetic connection device between the smart glasses body 1 and the wearable division 2.

The automatic magnetic connection device enables the back leg of split-type smart glasses body 1 to be solely provided with the fine and short eyeglass strap 3 connecting the two glasses legs, and is lighter than the all-in-one smart glasses, and the connecting work with the lower transmission line 5 of the wearable division 2 can be automatically completed with a wearing action simpler than the connecting required for today's split-type smart glasses; since the eyeglass strap 3 includes the upper magnetic connector 6, the length of which is longer than the distance from the two glasses legs to the lower magnetic connector 7 and is also preserved with enough margin. After the connection is completed, most of the weight of the eyeglass strap 3 is undertaken by the lower magnetic connector 7, and there is no tugging and pulling sensation for the movement of the head head up and down, left and right, so that the wearable smart glasses can provide a better sensation than that of existing all-in-one type and split-type eyeglasses, ensuring the duration of human-computer interaction.

Referring to FIG. 3, in one embodiment of the application, the wearable computer mainframe of the wearable division 2 can be selected from the S20 smartphone of the "Samsung" brand with dp system screen projection function plus battery, and is connected to the commercially available magnetic adapter of "Yishi" brand dp system, which is connected by automatic magnetic attraction by means of the lower transmission line with dp system, and then is connected to the Air Plus smart glasses receiving dp system of commercially available "RAYNEO" brand for projection display through the upper transmission line with dp system connected on the magnetic adapter.

In one embodiment of the application, said lower magnetic connector 7 is provided with a guiding block 8, which enables the lower magnetic connector 7 to always face upwards, and at the same time enables the upper magnetic connector 6 to be automatically attracted and guided by the lower magnetic connector 7 until they are correctly aligned and attracted to each other.

In one embodiment of the application, said lower magnetic connector 7 is provided with a fixing member 9, which can be the elastic clip or the magic tape to fix the lower magnetic connector to the collar or wearing apparel in a position at the scruff of user's neck.

In one embodiment of the application, the wearable division 2 may be provided on the scruff of the user's back or on both shoulders or in the pocket of the coat and pants or on the halter strap, necklace, scarf, one of the neckties or on the belt or on the bra or on the shoulder bag or on the vest, dress, article of clothing.

In one embodiment of the application, the outer surface of said wearable division 2 is provided with magnetic charging transmitting coil for wireless charging for the wearable computer mainframe or other devices and socket 11 for charging or powering itself or/and other devices.

In one embodiment of the application, the outer surface of the eyeglass strap 3 connected between the left glass leg to the right glass leg of the smart glasses body 1 is made in accordance with the hair color of various types of people (e.g., black, brown, grey, white); and the outer surface of the lower transmission line 5 of the wearable division 2 is made in accordance with the skin color of various types of people (e.g., black, white, brown).

In one embodiment of the application, the guiding block 8 and the elastic clip are provided with skin care protective layer of soft material on the surface facing the back of the user.

The thick and heavy power data transmission line of the wearable division of the invention extends to the shoulder and neck position behind the head in a hidden manner from its wearing position, being fixed on the clothing to remove the weight of the transmission line, avoid dragging the transmission line of the main body connected therewith, and at the same time, it also undertakes most of weight of the transmission line of the main body; the glasses main body and its short extending transmission line form a simple glasses with strap; the upper transmission line 4 of the smart glasses main body is automatically connected to the lower transmission line 5 of the division part 2, and finally reaching the smart glasses main body, simple appearance without long trailing lines, and the electrical connection with the division is completed automatically, so that putting on and taking off the glasses is simpler than the existing all-in-one and split-type glasses. the user's activities of head up and down, left and right are not subject to the interference of the transmission line's dragging and pulling restraints, without affecting the user's image, and it can satisfy the purpose of the whole day's long-lasting work.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

What is claimed is:

1. Split-type smart glasses, comprising a smart glasses body (1) for human-computer interaction output display, a wearable division (2) containing battery, and an automatic magnetic connection device for automatically attracting and connecting the power supply of smart glasses body (1) and wearable division (2) and/or data transmission lines;

an eyeglass strap (3) for connecting the two glasses legs is provided between two glasses legs of the smart glasses body (1); an upper transmission line (4) is hidden inside the eyeglass strap (3), and the upper transmission line (4) leads out of the middle section of the eyeglass strap (3) to connect to the automatic magnetic connection device; the wearable division (2) is connected to the automatic magnetic connection device via lower transmission line (5);

wherein said automatic magnetic connection device comprises an upper magnetic connector (6) and a lower magnetic connector (7), said upper magnetic connector (6) being connected to the glasses strap via the upper transmission line (4), said lower transmission line (5) extending to the scruff of the user's neck to connect to the lower magnetic connector (7); automatic connection is achieved through the action of wearing glasses.

2. The split-type smart glasses of claim 1 wherein said lower magnetic connector (7) is provided with a guiding block (8), which enables the lower magnetic connector (7) to always face upwards, and at the same time enables the upper magnetic connector (6) to be automatically attracted and guided by the lower magnetic connector (7) until they are correctly aligned and attracted to each other.

3. The split-type smart glasses of claim 2 wherein said lower magnetic connector (7) is provided with a fixing member (9), which fixes the lower magnetic connector (7) to the collar or wearing apparel in a position at the scruff of user's neck.

4. The split-type smart glasses of claim 3 wherein the guiding block (8) and the fixing member (9) are provided with skin-care protective layer of soft material on the surface facing the back of the user.

5. The split-type smart glasses of claim 4 wherein said fixing member (9) is elastic clip or the hook-and-loop fastener.

6. The split-type smart glasses of claim 1 wherein the upper transmission line (4) can be introduced into the eyeglass strap from one side of the glasses leg in a single bundle or in two bundles from both glasses legs.

7. The split-type smart glasses of claim 1 wherein said wearable division (2) is a wearable computer mainframe division containing battery or an external battery division after the wearable computer mainframe has been separated.

8. The split-type smart glasses of claim 1 wherein the outer surface of said wearable division (2) is provided with magnetic charging coil (10) for wireless charging for the wearable computer mainframe or other devices and socket (11) for charging or powering itself or/and other devices.

* * * * *